United States Patent [19]
Caswell et al.

[11] Patent Number: 5,964,891
[45] Date of Patent: Oct. 12, 1999

[54] DIAGNOSTIC SYSTEM FOR A DISTRIBUTED DATA ACCESS NETWORKED SYSTEM

[75] Inventors: Deborah L. Caswell, Santa Clara; Preeti N. Bhoj, Cupertino, both of Calif.; Sreenivasa N. Rao, Bangalore, Indonesia; Srinivas Ramanathan, Sunnyvale, Calif.

[73] Assignee: Hewlett-Packard Company, Palo Alto, Calif.

[21] Appl. No.: 08/924,416

[22] Filed: Aug. 27, 1997

[51] Int. Cl.⁶ .................................... G06F 11/00
[52] U.S. Cl. .................. 714/31; 714/46; 714/48
[58] Field of Search ................... 395/182, 183, 395/185; 714/9, 25, 26, 48, 31, 46

[56] References Cited

U.S. PATENT DOCUMENTS

| | | | |
|---|---|---|---|
| 5,333,268 | 7/1994 | Douglas et al. | 395/200 |
| 5,539,877 | 7/1996 | Winokur et al. | 395/183.02 |
| 5,594,840 | 1/1997 | Sahay et al. | 395/113 |
| 5,680,550 | 10/1997 | Kuszmaul et al. | 395/200.15 |
| 5,778,170 | 7/1998 | Chao | 395/183.16 |
| 5,784,616 | 7/1998 | Horvitz | 395/672 |

*Primary Examiner*—Joseph E. Palys
*Assistant Examiner*—Nguyen Xuan Nguyen
*Attorney, Agent, or Firm*—Thomas X. Li

[57] ABSTRACT

A diagnostic system for a data access networked system (e.g., an Internet/Intranet access networked system) is described. The data access networked system includes a number of data service systems coupled together. Each of the data service systems is independently administrated. The diagnostic system includes a number of diagnostic modules, each running a number of diagnostic tests within one of the data service systems upon receiving a diagnostic request. The diagnostic modules also transmit the diagnostic request and diagnostic results to one another using an open standard communication protocol. The diagnostic system also includes a diagnostic terminal that is coupled to a first diagnostic module of the diagnostic modules to generate the diagnostic request to the first diagnostic module and to display the diagnostic results received from the first diagnostic module. A diagnostic system for a data service system of a data access networked system is also described.

15 Claims, 12 Drawing Sheets

DIAGNOSTIC SYSTEM FOR A DISTRIBUTED DATA ACCESS NETWORKED SYSTEM

BACKGROUND OF THE INVENTION

1. Field of the Invention

The present invention pertains to interactive data access networked (e.g., Internet and/or Intranet) systems. More particularly, this invention relates to a diagnostic system for a distributed data access networked system having a number of independently administrated data service subsystems.

2. Description of the Related Art

The rapid growth of the Internet, widespread use of the World Wide Web, and a trend toward deployment of broadband residential networks have led to the development of new services such as interactive shopping, home banking, and electronic commerce. These services are federated since the Internet access networked system these services depend on spans over multiple independently administrated control domains.

Figure 1:
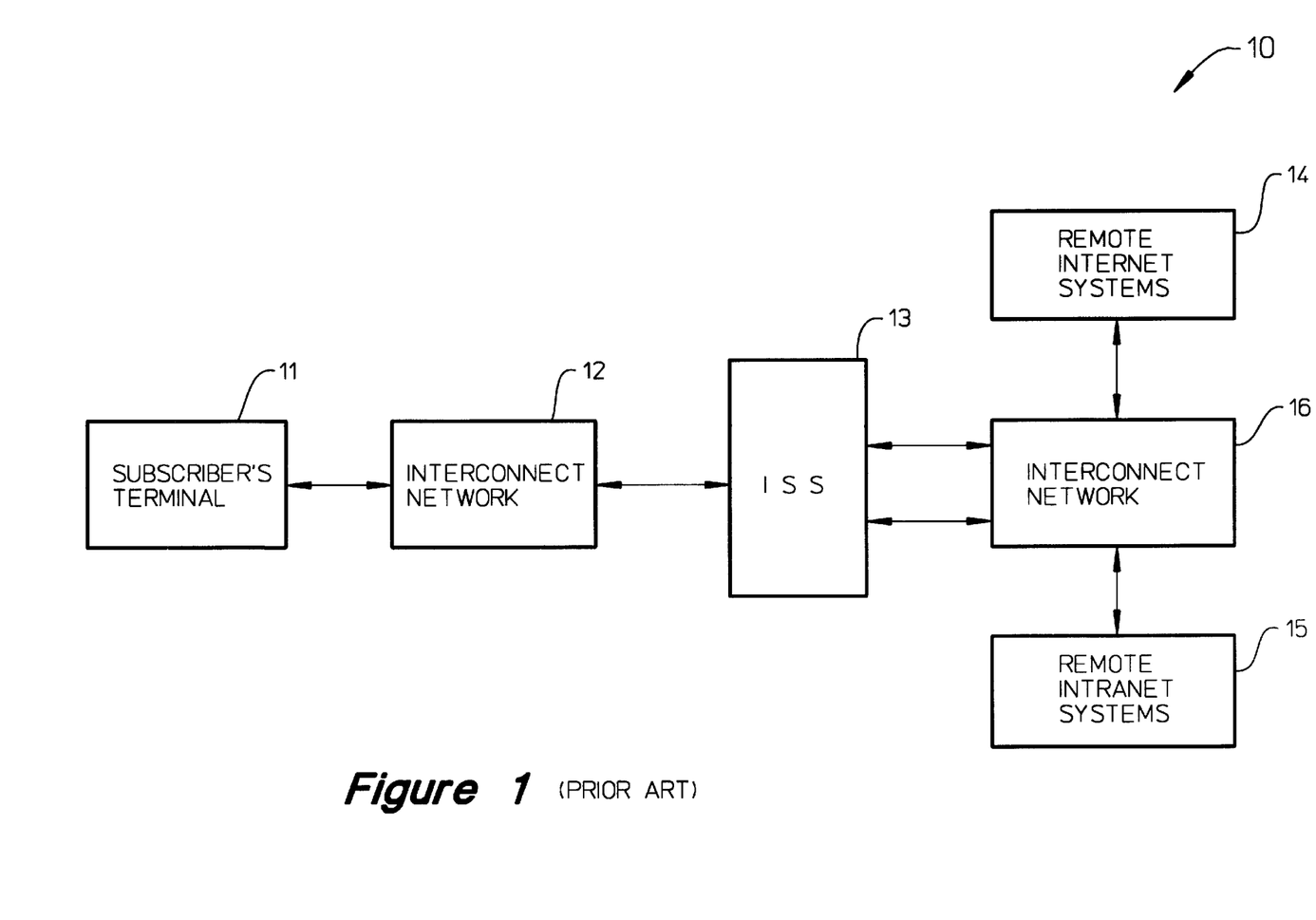
FIG. 1 shows a prior art data access networked system.

FIG. 1 shows a prior art Internet or Intranet access networked system 10. As can be seen from FIG. 1, the access networked system 10 typically includes a data service system 13 which is typically an Internet/Intranet service system (ISS). The data access networked system 10 also includes remote Internet and Intranet systems 14–15 connected to the ISS 13 via an interconnect network 16. Each of the systems 13–15 is an independently administrated system and the system administrator of one such system does not know the structure and configuration of another system.

The ISS 13 provides Internet or Intranet service to its subscriber sites (e.g., site 11) via an interconnect network 12. Subscribers connect directly to the ISS 13 from their terminals (e.g., personal computers, Macintoshes, Web terminals, etc.) via the interconnect network 12.

The ISS 13 typically includes content servers that store data for access from the subscriber sites. The content servers typically support servers for Internet applications, such as electronic mail, bulletin boards, news groups, and World Wide Web access. In addition, the ISS 13 may have web proxy servers that allow a network administrator to restrict access to the remote Internet systems 14 or remote Intranet systems 15. Another use of the proxy servers is to cache frequently accessed data from the Internet. The ISS 13 may also include address assignment servers. The address assignment servers assign an address to a user terminal when it is first connected to the ISS 13. The assigned address uniquely identifies the terminal in the ISS 13.

Subscribers in the ISS 13 usually refer to servers in the ISS 13, in the remote Internet systems 14, and in the remote Intranet systems 15, by their host names. However, routing of packets to and from the servers is based on network addresses assigned to the servers rather than the host names. In the ISS 13, Domain name servers (DNS) are used to translate subscriber references to host names into network addresses of the servers. The DNS may themselves rely on other DNS servers in the remote Internet systems 14 and the remote Intranet systems 15 to determine the host name to network address mappings.

Other components or modules that are typical of the ISS 13 are a firewall that controls access to and from the system 13, and a router or routers for routing transmissions to and from subscribers, and to and from the remote Internet systems 14 and the remote Intranet systems 15.

The ISS 13 typically employs the Internet Protocol (IP) for data communication to and from various servers, as well as with the remote systems 14 and 15. The Transmission Control Protocol (TCP) operates above the IP layer and ensures reliable delivery of information to the content servers in the systems 13–15. The application protocols that operate above the TCP layer are specific to the applications being accessed by subscribers. For example, the File Transfer Protocol (FTP) is used for file transfers and the Hyper Text Transport Protocol (HTTP) is used for web accesses.

Each of the remote Internet systems 14 or each of the remote Intranet systems 15 typically includes the same or similar servers and modules as those described above for the ISS 13.

Managing and maintaining such a distributed networked system, however, is typically very difficult. Because each data service system is independently administrated, the entire networked system spans multiple independently administrated control domains. In this case, only a portion of the networked system can be observed and controlled by anyone given authority (e.g., a system administrator of one Internet service system). The system administrator of one control domain is not able to access another control domain to detect problems in that control domain. In order for the entire networked system to be checked for problems, the system administrator of one control domain has to contact the system administrator of all other control domains to check their systems. Likewise, when the networked system includes a customer support representative to provide customer support services for the networked system, the representative must contact the system administrators of all the control domains of the networked system in order to check the entire networked system. This thus makes it difficult to manage the federated services provided by the access networked system and to provide effective customer support of these services.

SUMMARY OF THE INVENTION

One feature of the present invention is to isolate the source of problems within an access networked system that spans multiple independently administrated control domains.

Another feature of the present invention is to detect problems within an access networked system that spans multiple independently administrated control domains in an efficient and effective manner.

A further feature of the present invention is to remotely and automatically detect problems within an access networked system that spans multiple independently administrated control domains from a single detection source.

Described below is a diagnostic system for a data access networked system (e.g., an Internet/Intranet access networked system). The data access networked system includes a plurality of data service systems coupled together. Each of the data service systems is independently administrated. The diagnostic system includes a number of diagnostic modules, each running a number of diagnostic tests within one of the data service systems upon receiving a diagnostic request. The diagnostic modules also transmit the diagnostic request and diagnostic results to one another using an open standard communication protocol (e.g., HTTP). The diagnostic system also includes a diagnostic terminal that is coupled to a first diagnostic module of the diagnostic modules to generate the diagnostic request to the first diagnostic module and to display the diagnostic results received from the first diagnostic module.

In addition, a diagnostic system for a data service system of a data access networked system is also described. The diagnostic system includes a diagnostic server within the data service system to initiate a plurality of diagnostic tests to detect faulty modules within the data service system upon receiving a diagnostic request. A diagnostic terminal is coupled to the data service system to transmit the diagnostic request to the diagnostic server using an open standard communication protocol (e.g., HTTP). The data service system is independently administrated.

Other features and advantages of the present invention will become apparent from the following detailed description, taken in conjunction with the accompanying drawings, illustrating by way of example the principles of the invention.

DETAILED DESCRIPTION OF THE INVENTION

Figure 2:
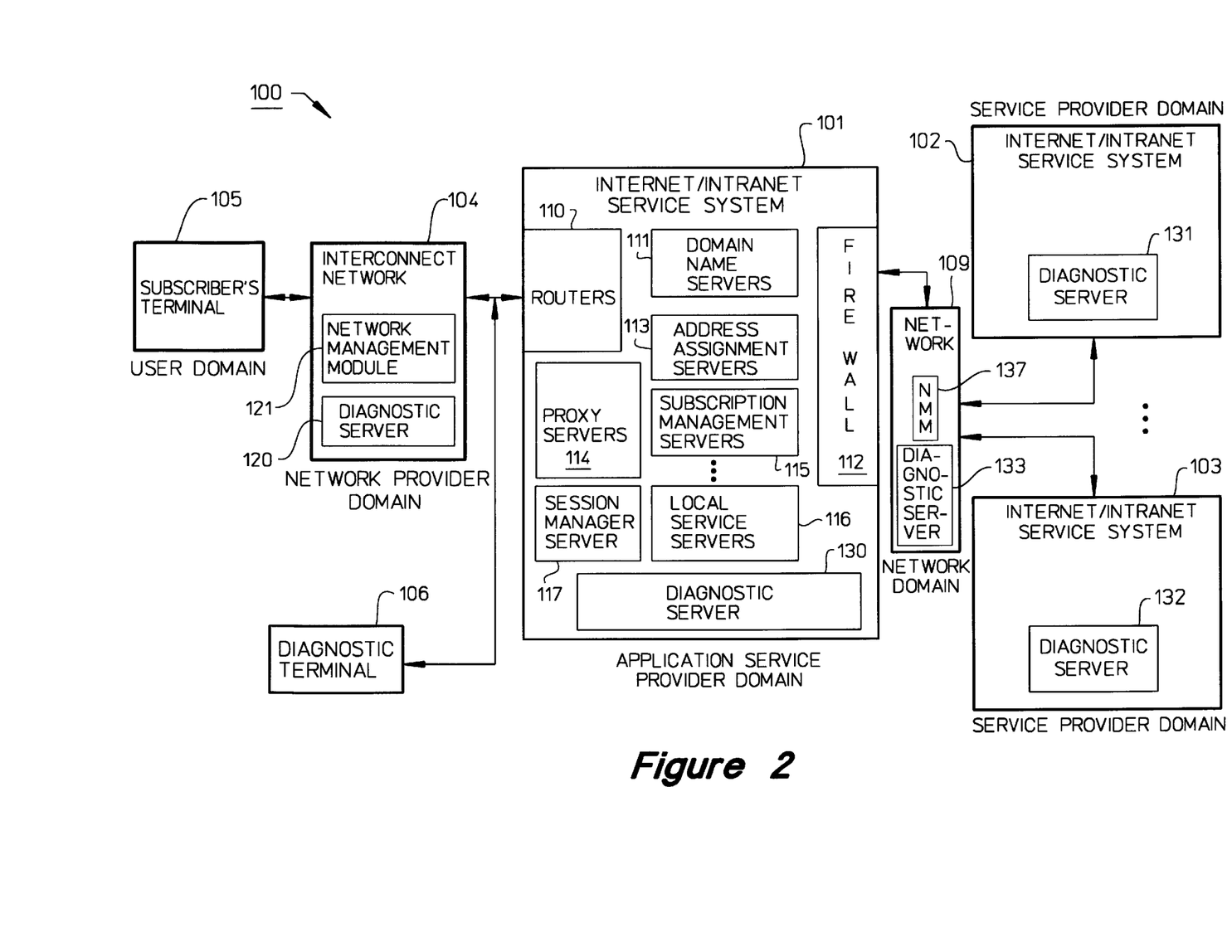
FIG. 2 shows a data access networked system that includes a diagnostic system that implements one embodiment of the present invention, wherein the diagnostic system includes a number of diagnostic servers or modules and a diagnostic terminal.

FIG. 2 shows a data access networked system 100 that includes a number of data service systems (e.g., the data service systems 101–103) that are connected together via an interconnect network 109. Each of the data service systems can be employed by an Internet/Intranet service provider to offer data (e.g., web) services to users or subscribers connected to the respective data service system. Thus, each of the data service systems 101–103 can be also referred to as an Internet/Intranet service system (ISS).

Data communications among the ISSs 101–103 are conducted using a predetermined open standard communication protocol for Internet/Intranet communications. In one embodiment, the open standard communication protocol is the Hyper Text Transport Protocol (HTTP). Alternatively, other known open standard communication protocols for Internet/Intranet communications can also be used.

As can be seen from FIG. 2, the data access networked system 100 is a federated or distributed networked system that spans multiple independently administrated control domains. This means that each of the ISSs 101–103 and each of the interconnect networks 104 and 109 is an independently administrated control domain that can only be physically accessed and administrated by a single detection source or entity within that control domain. Alternatively, all of the components of the data access networked system 100 may reside completely within a single administrated control domain. To detect any faulty module or component within the entire data access networked system 100, a diagnostic system is provided in the data access networked system 100 in accordance with one embodiment of the present invention.

As will be described in more detail below, the diagnostic system in accordance with one embodiment of the present invention includes a diagnostic terminal 106 and a number of diagnostic servers or modules (e.g., the diagnostic servers 120 and 130 through 133). Each of the diagnostic servers 120 and 130–133 is located within an independently administrated control domain. This means that each diagnostic server is located in one of the systems 101–104 and 109 of the data access networked system 100.

The function of the diagnostic terminal 106 is to allow its user or operator to generate a diagnostic request, and to send the diagnostic request to the diagnostic server 130 that is connected to the terminal 106. The function of each of the diagnostic servers (e.g., the diagnostic servers 120 and 130–133) is to launch tests or test routines within the respective control domain, and to pass the diagnostic request to other diagnostic servers using the open standard communication protocol such that the other diagnostic servers can also launch tests within their respective control domains. In this way, the entire data access networked system 100 can be checked for any faulty or malfunctioning module or components from a single remote detection source (e.g., the diagnostic terminal 106) even though the system 100 spans multiple independently administrated control domains. The diagnostic terminal 106 is also used to display the diagnostic results received from the diagnostic servers. The diagnostic system in accordance with the present invention will be described in more detail below.

As can be seen from FIG. 2, one subscriber terminal 105 is connected to the ISS 101 of the data access networked system 100 via an interconnect or access network 104. This is for illustration purposes only. In practice, each of the ISSs 101–103 may be connected with a number of subscriber terminals.

The subscriber terminals may be at the residences, schools, or offices of the subscribers/users. Each of the subscriber terminals (e.g., the terminal 105) includes a web browser that allows the subscriber to access the Internet or Intranet services via the ISS (e.g., the ISS 101).

Each subscriber terminal (e.g., the terminal 105) can be a personal computer, a network computer, a notebook computer, a workstation, a mainframe computer, a supercomputer, or any other type of data processing system. In addition, each subscriber terminal may include a modem or a network adapter, depending on the network technology adopted for the interconnect network 104.

As can be seen from FIG. 2, the subscriber terminal 105 is connected to the ISS 101 via an interconnect or access network 104. The ISS 101 is connected to the other ISSs 102–103 via the interconnect network 109. Each of the networks 104 and 109 also includes a network management module (NMM) (e.g., the module 121 or 137) for managing the respective network. The NMM can be implemented by known network management system.

Data communications from the subscriber terminal 105 to the ISS 101 are conducted using the same open standard communication protocol as that used among the ISSs 101–103. This means that the data communications within the entire data access networked system 100 are conducted in accordance with a single open standard communication protocol.

Each of the networks 104 and 109 can be any known network, such as Ethernet, ISDN (Integrated Services Digital Network) network, ADSL network, T-1 or T-3 link, cable or wireless LMDS network, telephone line network, or FDDI (Fiber Distributed Data Network) network. Alternatively, the networks 104 and 109 can be other known networks.

Each of the ISSs 101–103 provides Internet or Intranet service to its respective subscribers. Thus, each of the ISSs 101–103 may be an online service system, such as America Online or Compuserve, a local Internet service system, or an Intranet service system. For the subscribers of the ISS 101, access to web content servers in the ISSs 102 and 103 can be regarded as two other services offered by the ISS 101. FIG. 2 only shows the functional structure of the ISS 101. This is because the functional structure of each of the ISSs 102–103 is substantially the same as that of the ISS 101, although the physical configuration of each of the ISSs 101–103 may be different from one another. Thus, only the functional structure of the ISS 101 will be described below.

The ISS 101 includes routers 110 for routing data to and from various modules within the ISS 101. The routers 110 function to connect the remote subscriber terminals (e.g., the terminal 105) to the appropriate on-premises servers 111 and 113 through 116, or to the ISS 102 or 103 via a firewall 112. The routers 110 may use Asynchronous Transfer Mode (ATM) technologies to enable high bandwidth communication. The routers 110 may include a number of separate routers and/or switching devices.

The servers in the ISS 101 include domain name servers (DNSs) 111, address assignment servers (e.g., Dynamic Host Configuration Protocol, DHCP servers) 113, proxy servers 114, subscription management servers 115, local service servers 116, and session manager servers 117. In addition, the ISS 101 may include other servers (not shown).

The local service servers 116 store contents that include Hyper-Text Markup Language (HTML) web pages, gif images, video clips, etc. Data transfers to and from the local service servers 116 are enabled by transport protocols such as Transport Control Protocol (TCP) and the User Datagram Protocol (UDP). The local service servers 116 can support a variety of Internet applications to provide services such as access to the World Wide Web, electronic mail, bulletin boards, chat rooms, and news groups. Using web browser and other client applications, subscribers can access Web pages, news, and e-mail stored in the local service servers 116 via their subscriber terminals. In addition, the subscribers can also access Web pages located at remote sites of the other ISSs 102–103.

The address assignment servers 114 assign an address to a subscriber terminal when it first accesses the ISS 101. The assigned address uniquely identifies the terminal in the system 101. The address can be determined statically (i.e., at the time the user subscribes to the ISS 101), or dynamically (i.e., the subscriber terminal may get a different address each time it is connected to the ISS 101). Specialized address assignment protocols such as Dynamic Host Configuration Protocol (DHCP) are used by the address assignment servers to assign addresses to subscriber terminals.

The proxy servers 114 may be used to enhance security of accesses to and from the remote subscriber terminals (e.g., the terminal 105), as well as to speed up Internet access by caching frequently accessed data locally. The caching function of the proxy servers 114 improve the response time that users perceive for web accesses. Caching also reduces the number of accesses to the other ISSs 102–103. The security feature of the proxy servers 114 allows the web operator to limit the web sites that users can access. This is done by ensuring all user accesses pass through the proxy servers 114.

The DNS servers 111 provide mapping between host names and network addresses. This process is referred to as name resolution. Before accessing a web content server, the subscriber's web browser application first contacts one of the DNS servers 111 to find out the network address of the web content server. The DNS server may in turn rely on other DNS servers in the ISS 101, or in other ISSs 102–103 to assist in the name resolution. If the resolution fails, the web transfer is aborted. To minimize the time for the name resolution, the DNS servers 111 maintain local caches of the most recently requested host name-to-IP address mapping.

The session manager servers 117 of the ISS 101 are used for the housekeeping purposes. For example, the session manager servers 117 keep track of usage time of the networked system 100 by each customer for billing. The session manager servers 117 also handle tracking and s security for the ISS 101.

The firewall 112 controls access to and from the ISS 101 from the other ISSs 102–103. Firewalls may be implemented in hardware or software and are included to enhance security of the ISS 101. Examples of known firewall technologies are packet-level filters and application-level gateways (e.g., socks).

In addition, the ISS 101 may include a network address translator (not shown) that translates between a "private" address and a "public" address. The "private" address is used for a user to access servers within the ISS 101 and the "public" address is used for the user to access web sites in the other ISSs 102–103 that are outside the ISS 101. In cases when subscriber terminals are assigned "public" addresses directly, the ISS does not include the network address translator.

All of the modules 110–117 in the ISS 101 can be implemented by known means. The servers and firewalls 111–117 are functional components that may be run by one or more host computer systems (not shown in FIG. 2) within the ISS 101. This means that different types of servers and firewalls may be running in one host computer system or one of the servers or firewalls may be run by two or more host computer systems.

As described above, the data access networked system 100 is a federated system that spans over multiple control domains. As can be seen from FIG. 2, the ISS 101 is an independently administrated control domain. This means that the system 101 is managed and administrated by a single operator or entity. When the system 101 is not functioning properly, the operator of the system 101 can run a number of tests to determine if any component of the system 101 is faulty or malfunctioning. The operator or entity of another control domain, however, cannot access the system 101 to determine if anything is wrong within the system or not. Likewise, each of the ISSs 102 and 103 and each of the networks 104 and 109 is also an independently administrated control domain. Each of the ISSs 101–103 is referred to as application service provider domain or service provider domain. Each of the interconnect networks 104 and 109 is referred to as network provider domain. The subscriber terminal 105 is another independently administrated control domain which is referred to as user domain.

To be able to detect any faulty or malfunctioning module or component within each control domain of the data access networked system 100 from a single detection source, the diagnostic system in accordance with one embodiment of the present invention places each of the diagnostic servers 120 and 130–133 in each control domain. This means that the ISS 101 includes the diagnostic server 130, the ISS 102 includes the diagnostic server 131, and the ISS 103 includes the diagnostic server 132. In addition, the diagnostic server 120 is within the interconnect network 120 and the diagnostic server 133 is within the interconnect network 109.

The function of each of the diagnostic servers (i.e., the diagnostic servers 120 and 130–133) is to invoke or run a number of diagnostic tests within the respective control domain upon receiving a diagnostic request. The diagnostic tests are predetermined tests for the particular system. The diagnostic server also correlates the test results of the diagnostic tests to determine which module or component within the system under test is Anot or malfunctioning.

Another function of each of the diagnostic servers is to pass or relay the diagnostic request to other diagnostic servers within other control domains (e.g., the ISSs 102–103 and the interconnect networks 104 and 109) using the same open standard communication protocol. Once the other diagnostic servers receive the diagnostic request, they also invoke or run their diagnostic tests within their respective control domains to find if any module or component within the respective systems is faulty or malfunctioning. In this way, the entire data access networked system 100 can be checked from a single detection source even though the system 100 spans multiple independently administrated control domains. As described above, the open standard communication protocol can be the HTTP protocol for Internet/Intranet communications.

Each of the diagnostic servers 120 and 130–133 is a functional module within its respective system. This means that each diagnostic server can be run by one or more host computer systems within the respective ISS or interconnect network system. In addition, each of the diagnostic servers 120 and 130–133 is a multi-threaded diagnostic server. The structure of each of the diagnostic servers 120 and 130–133 will be described in more detail below, also in conjunction with FIGS. 3–12.

Referring again to FIG. 2, the diagnostic system in accordance with one embodiment of the present invention employs the diagnostic terminal 106 to generate the diagnostic request. As can be seen from FIG. 2, the diagnostic terminal 106 is connected to the ISS 101. Alternatively, the diagnostic terminal 106 can be connected to the ISS 101 via the interconnect network 104. In addition, the data access networked system 100 may have more than one diagnostic terminal.

The diagnostic terminal 106 sends the diagnostic request to the ISS 101 which is then routed within the ISS 101 to the diagnostic server 130. This causes the diagnostic server 130 to invoke the tests or test routines and to pass the diagnostic request to other diagnostic servers (e.g., the diagnostic server 131 or 132). In doing so, the customer support representative of the data access networked system 100 can check the entire system 100 by generating the diagnostic request at a single detection source (i.e., the diagnostic terminal 106) that is remote from any independently administrated control domain. The diagnostic terminal 106 also displays the correlated test results received from the diagnostic server 130.

The diagnostic terminal 106 can be a personal computer, a network computer, a notebook computer, a workstation, a mainframe computer, a supercomputer, or any other type of data processing system that supports a web browser or other known network access functions.

Figure 3:
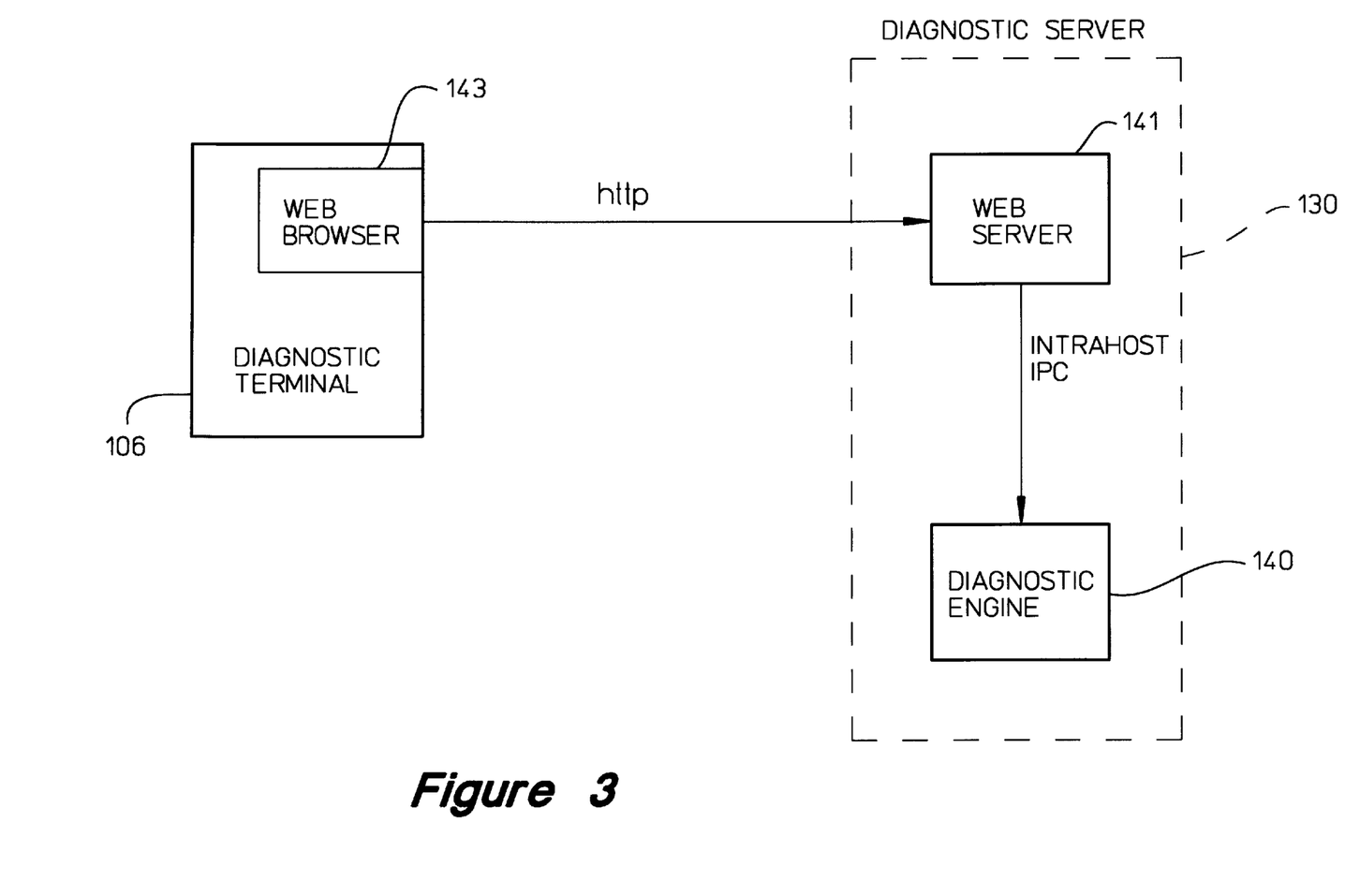
FIG. 3 shows the structure of the diagnostic terminal and each of the diagnostic servers of the diagnostic system of FIG. 2.

FIG. 3 shows in block diagram form the structure of the diagnostic terminal 106 and the structure of the diagnostic server 130. The structure of the other diagnostic servers (e.g., the diagnostic servers 120 and 131–133) is not shown in FIG. 3 because it is substantially the same as that of the diagnostic server 130. As can be seen from FIG. 3, the diagnostic terminal 106 includes a web browser 143. The diagnostic server 130 includes a web server 141 and a diagnostic engine 140 connected to the web server 141.

In one embodiment, the web browser 143 is a Netscape Navigator web browser manufactured and sold by Netscape Communications Corporation of Mountain View, Calif. In another embodiment, the web browser 143 is a Microsoft Internet Explorer web browser manufactured and sold by Microsoft Corporation of Redmond, Washington. Alternatively, the web browser 143 can be implemented by other known web browser software.

The web browser 143 of the diagnostic terminal 106 allows generation of the diagnostic request in the diagnostic terminal 106. The diagnostic request includes information about the subscriber and the problems the subscriber is experiencing. The information is filed into an HTML-based web page 400 (shown in FIG. 10) rendered by the web browser 143. Then the web browser 143 sends the diagnostic request web page to the diagnostic server 130. After the diagnostic server 130 invokes the tests and correlates the test results, the correlated test results are sent back to the diagnostic terminal 106 to be displayed. Again, the correlated test result information is filed into an HTML-based web page 450 (shown in FIG. 11) rendered by the web browser 143. The web pages 400 and 450 are described in more detail below, in conjunction with FIGS. 10 and 11.

Figure 10:
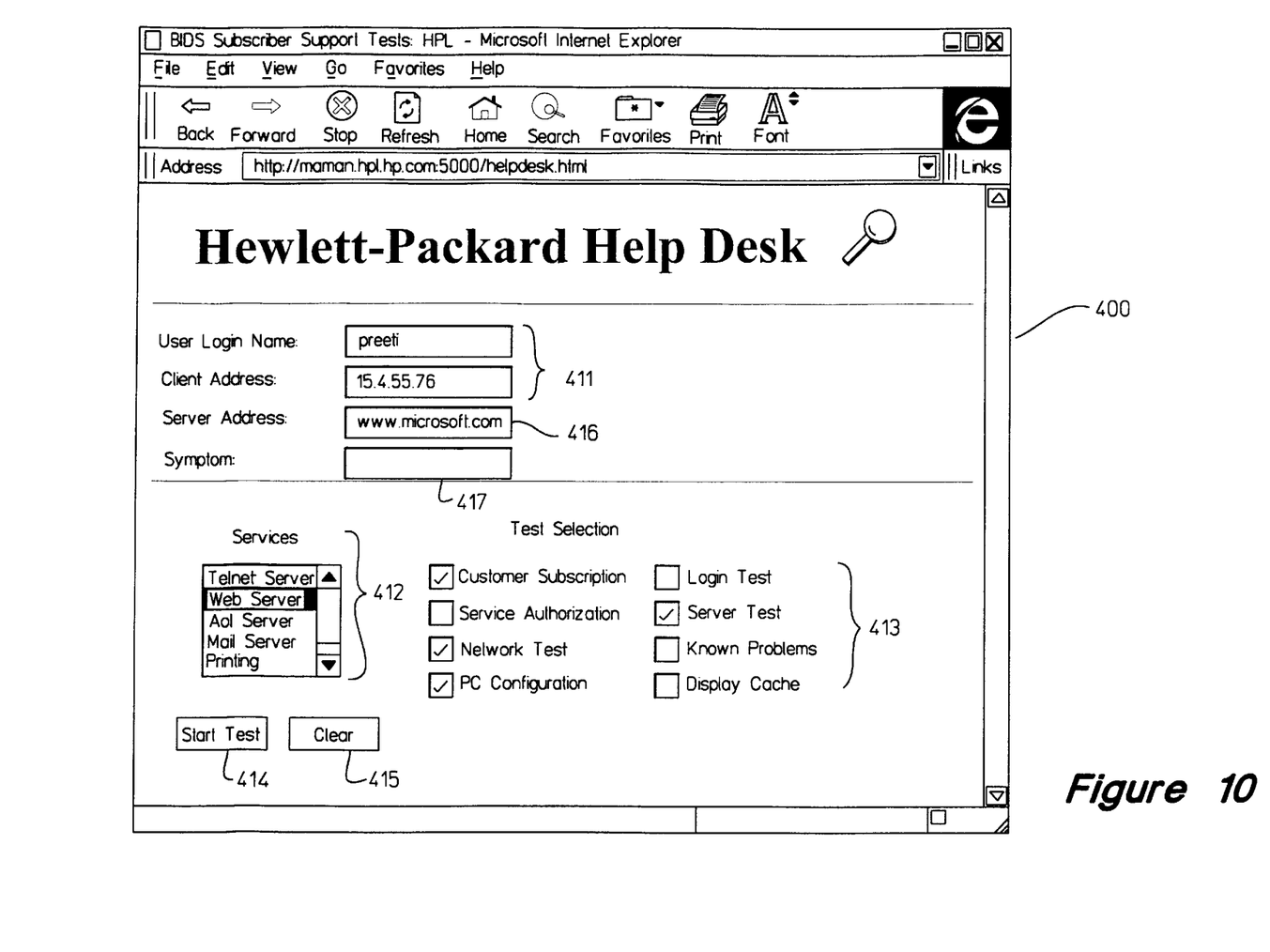
FIG. 10 shows the diagnostic request web page sent from the diagnostic terminal to the respective diagnostic server.

As can be seen from FIG. 10, the diagnostic request web page 400 includes a Name and IP Address field 411 that identifies the customer who is currently experiencing a problem with the services provided by the system 100. In addition, a Server Address field 416 may be provided to specify the information about the failed server.

The web page 400 also includes a Service field 412. This field 412 specifies the type of service the user is unable to use or access. Moreover, the web page 400 includes a Test Selection field 413. The Test Selection field 413 lists a number of tests or test routines that, once selected by the operator, can be run by the diagnostic server 130. The Start Test field 414 allows the written web page 400 to be sent to the diagnostic server 130 with the data written in the web page 400. The Clear field 415 allows all the data written in the web page 400 to be cleared. Through the web page 400, the user or operator can generate the diagnostic request, selecting the relevant test routines. The written web page 400 is then sent from the diagnostic terminal to the web server 141 (FIG. 3) of the diagnostic server 130.

Figure 11:
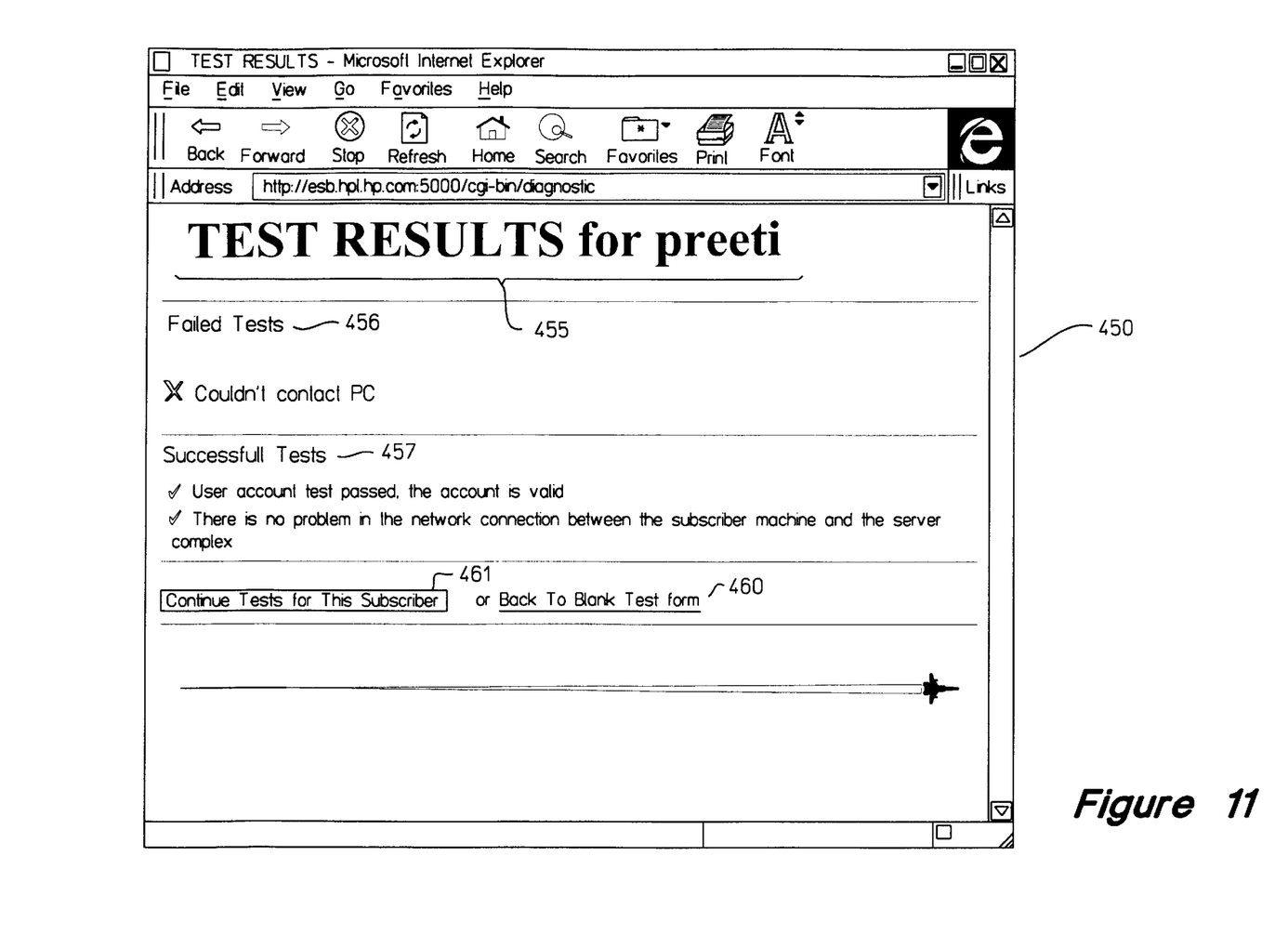
FIG. 11 shows the diagnostic result web page received and displayed on the diagnostic terminal from the respective diagnostic server.

As can be seen from FIG. 11, the test result web page 450 includes a Title field 455 that indicates the web page 450 is for displaying the test results requested by a particular operator. The web page 450 also includes a Failed Tests field 456 that indicates failed tests, and a Successful Test field 457 that indicates successful tests. In addition, the Continue-Tests-for-This-Subscriber field 461 and the Back-to-Blank-Tests-field 460 link the web page 450 back to the web page 400. Alternatively, the test result web page 450 can be rendered in other forms.

Referring back to FIG. 3, the web browser 143 controls sending the diagnostic request web page 400 to the diagnostic server 130 from the diagnostic terminal 106 using the open standard communication protocol (e.g., HTTP). Within the diagnostic server 130, the web server 141 is used to receive the diagnostic request sent from the diagnostic terminal 106. The web server 141 can be implemented using known web server technologies. In one embodiment, the web server 141 is implemented using the web server technology developed by Netscape Communications Corporation. In another embodiment, the web server 141 can be implemented using the web server technology developed by Microsoft Corporation.

The web server 141 in the diagnostic server 130 decodes the diagnostic request. The web server 141 then parses and packages up the data contained in the diagnostic request web page sent by the web browser 143. This means that the web server 141 puts the decoded request in the proper data structure (e.g., the data structure specified by the Netscape Application Programming Interface from Netscape Communications Corp.). The processed request is then sent to the diagnostic engine 140 via an intrahost communication socket. Thus, the web server 141 can be viewed as a pass-through element that enables communication between the diagnostic terminal 106 and the diagnostic engine 140. There is no diagnosis intelligence in the web server 141.

The intrahost communication socket is a communication protocol. In one embodiment, the socket is a UNIX domain socket. Alternatively, the socket can be other types of known sockets (e.g., INET socket).

The diagnostic engine 140 receives the processed data of the diagnostic request web page from the web server 141. The diagnostic engine 140 is responsible for interpreting the data within the diagnostic request. The diagnostic engine 140 then invokes the test routines that are specified in the diagnostic request. Alternatively, the diagnostic engine 140 can be an intelligent one that determines which tests are to be invoked based on the information contained in the diagnostic request and based on the history information of the ISS 101. The history information may include knowledge of previous troubleshooting experience and service topology information of the system.

The test routines are known test routines that, when run, check various parts (including the servers and other components) of the ISS 101. Thus, the test routines will not be described in more detail below.

The diagnostic engine 140 receives the test results from the executed test routines and then correlates the test results to determine which module or component is faulty or malfunctioning. The final result is then sent to the diagnostic terminal 106 for display via the web server 141.

If the correlated test result indicates that none of the modules or components is faulty or malfunctioning, then the diagnostic engine 140 regenerates the diagnostic request in the HTML-based form and passes the diagnostic request to another diagnostic server in another system (e.g., the diagnostic server 120, 131, 132, or 133). The web server of the other diagnostic server will then invoke its respective diagnostic engine to run a number of tests in the respective system. The correlated test result of the other system is then sent back the diagnostic engine 140 from the other diagnostic server. In this way, the entire networked system 100 can be detected even though it spans multiple independently administrated control domains.

Figure 4:
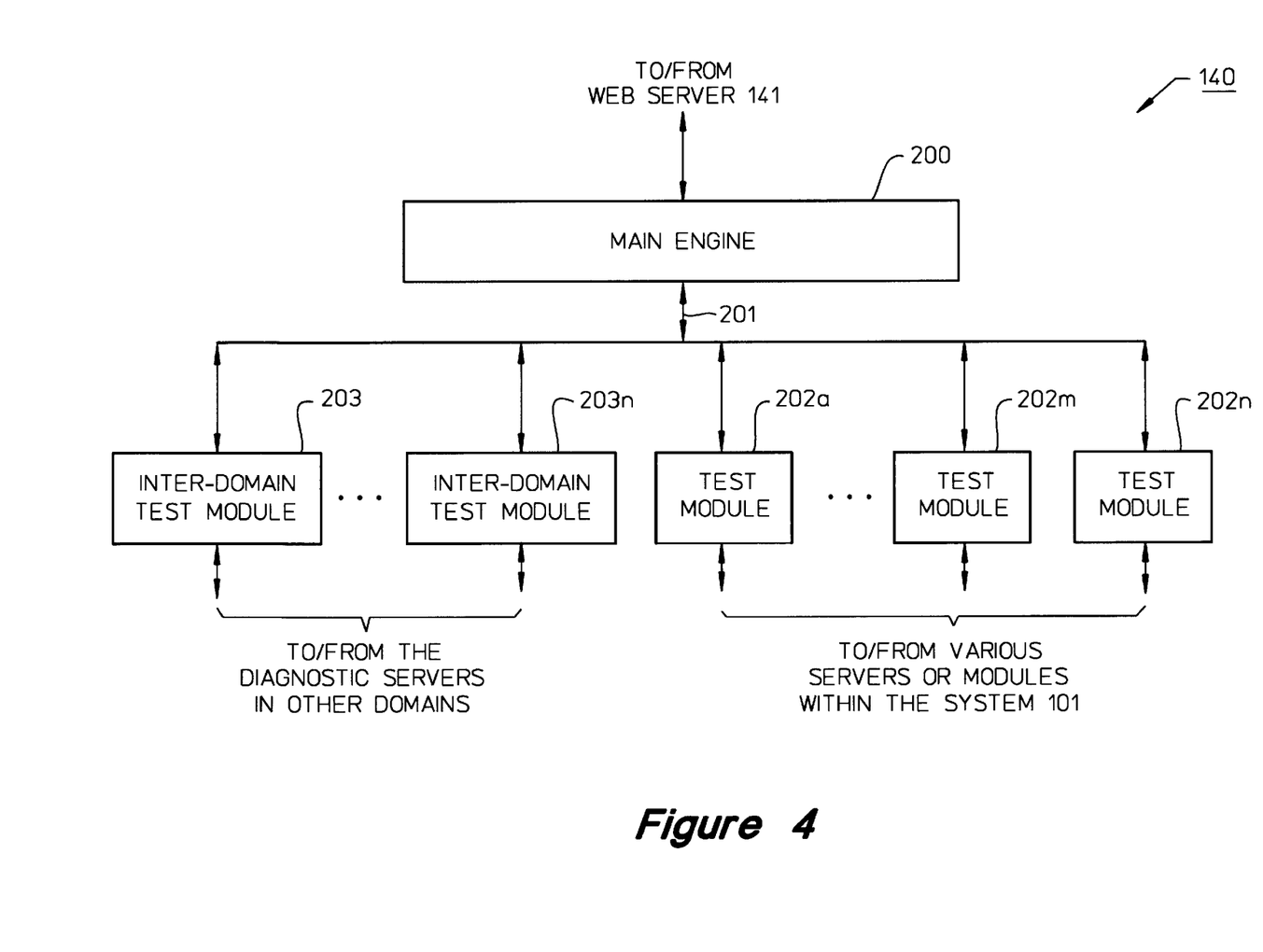
FIG. 4 shows the structure of the diagnostic engine of the diagnostic server of FIG. 3 that includes a main engine, a number of inter-domain test modules, and a number of test modules.

FIG. 4 shows in block diagram form the structure of the diagnostic engine 140. As can be seen from FIG. 4, the diagnostic engine 140 includes a main engine 200, a number of test modules 202a through 202n, and a number of inter-domain test modules 203 through 203n. The main engine 200 communicates with the web server 141 (FIG. 3) via sockets. The main engine 200 communicates with the test modules 202a–202n and the inter-domain test modules 203–203n through function calls.

The main engine 200 is responsible for interpreting the data of the diagnostic request. The main engine 200 also invokes the test modules and/or the inter-domain test modules in accordance with the diagnostic request. The invoked test module (e.g., the test modules 202a–202n) are then executed to check the servers or components within the ISS 101. In one embodiment, if the tests indicate there is no problem within the ISS 101, the main engine 200 then invokes the specified inter-domain test modules (e.g., the inter-domain test modules 203a–203n) to check the servers and components of other systems (i.e., the systems 102–104 and 109). In another embodiment, the main engine 200 simply invokes the specified (or all) inter-domain test modules at the same time the test modules 202a–202n are invoked. The test results are then sent back the main engine 200. The main engine 200 then correlates the test results to find out which component or server in which system is faulty or malfunctioning. This process of the main engine 200 is shown in FIG. 5 which will be described in more detail below.

Figure 5:
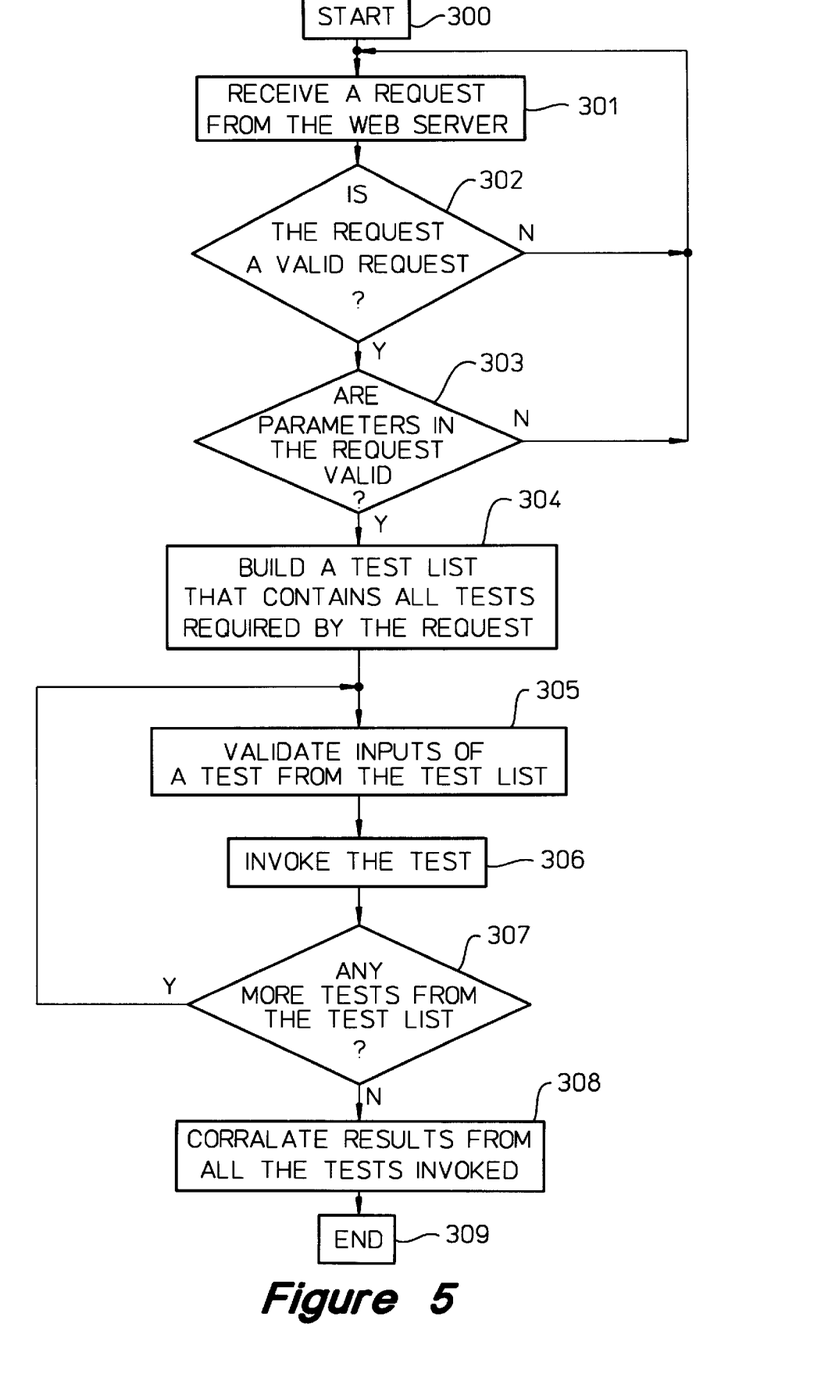
FIG. 5 shows in flow chart diagram form the process of the main engine of the diagnostic engine of FIG. 4.

As can be seen from FIG. 5, the process starts at the step 300. At the step 301, the main engine 200 receives the diagnostic request from the web server 141 (FIG. 3). At the step 302, the main engine 200 determines if the request is a valid request. If not, the process returns to the step 301 to receive another request. If the answer is yes, then the main engine 200 goes to the step 303 where the main engine 200 determines if the parameter data of the request are valid. If not, the process returns to the step 301. If yes, the step 304 is performed where the main engine 200 builds a test list that contains all tests specified by the parameter data of the diagnostic request. Then the steps 305 and 306 are performed at which the main engine 200 validates the input data of a test contained in the test list and invokes the test. At the step 307, the main engine 200 determines whether there are more tests in the test list that have not been run. If so, the steps 305–306 are repeated. If not, the step 308 is executed at which the main engine 200 correlates the test results from all tests invoked. The process then ends at the step 309.

Figure 6:
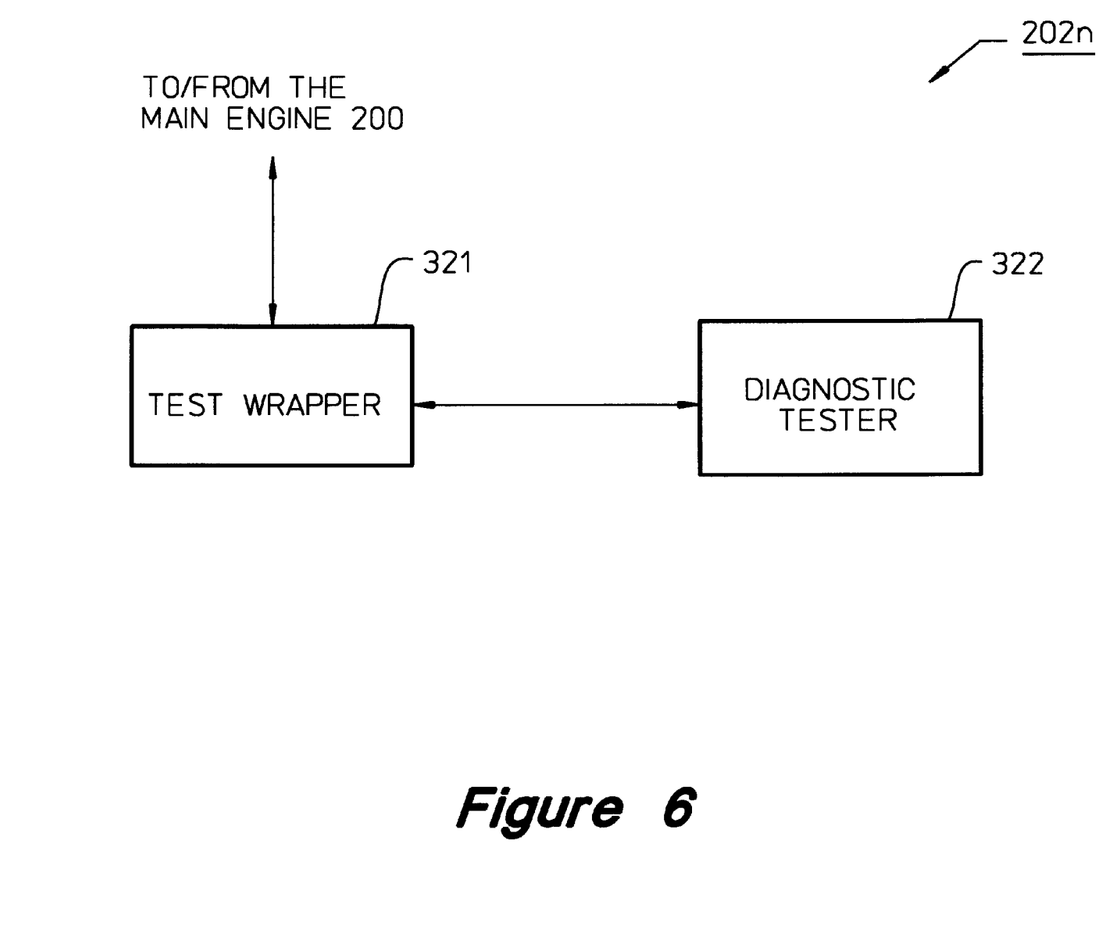
FIG. 6 shows the structure of each of the test modules of FIG. 5.

FIG. 6 shows the structure of the test module 202n of the diagnostic engine 140 of FIG. 4. As can be seen from FIG. 6, the test module 202n includes a test wrapper 321 and a diagnostic tester 322. The test wrapper 321 is used to interpret and validate the input data from the main engine 200. The input data are to be relied on during the execution of the test routine in order to yield the test results. If the input data are determined not to be valid (or complete), the test wrapper 321 is responsible for attempting to make the data valid by calling a fiction in the main engine 200 (FIG. 4) that will validate the data.

Once the input data are validated, the test wrapper 321 invokes the diagnostic tester 322. The communication between the two modules are done using function calls. The diagnostic tester 322 then performs the predetermined diagnosis. The diagnostic tester 322 is responsible for running the actual diagnosis. Each diagnostic tester has a predetermined test fiction and is responsible for initializing and maintaining its own static state. The test wrapper 321 then interprets the test results of the diagnostic test, constructs the test results buffer for the main engine 200, and validates any data that were obtained by executing the diagnostic test.

FIG. 6 does not show the structure of all other test modules 202a–202m because they basically have substantially the same functional structure as that of the test module 202n. The only difference is that each of the test modules 202a–202n has a different diagnostic tester.

Figure 7:
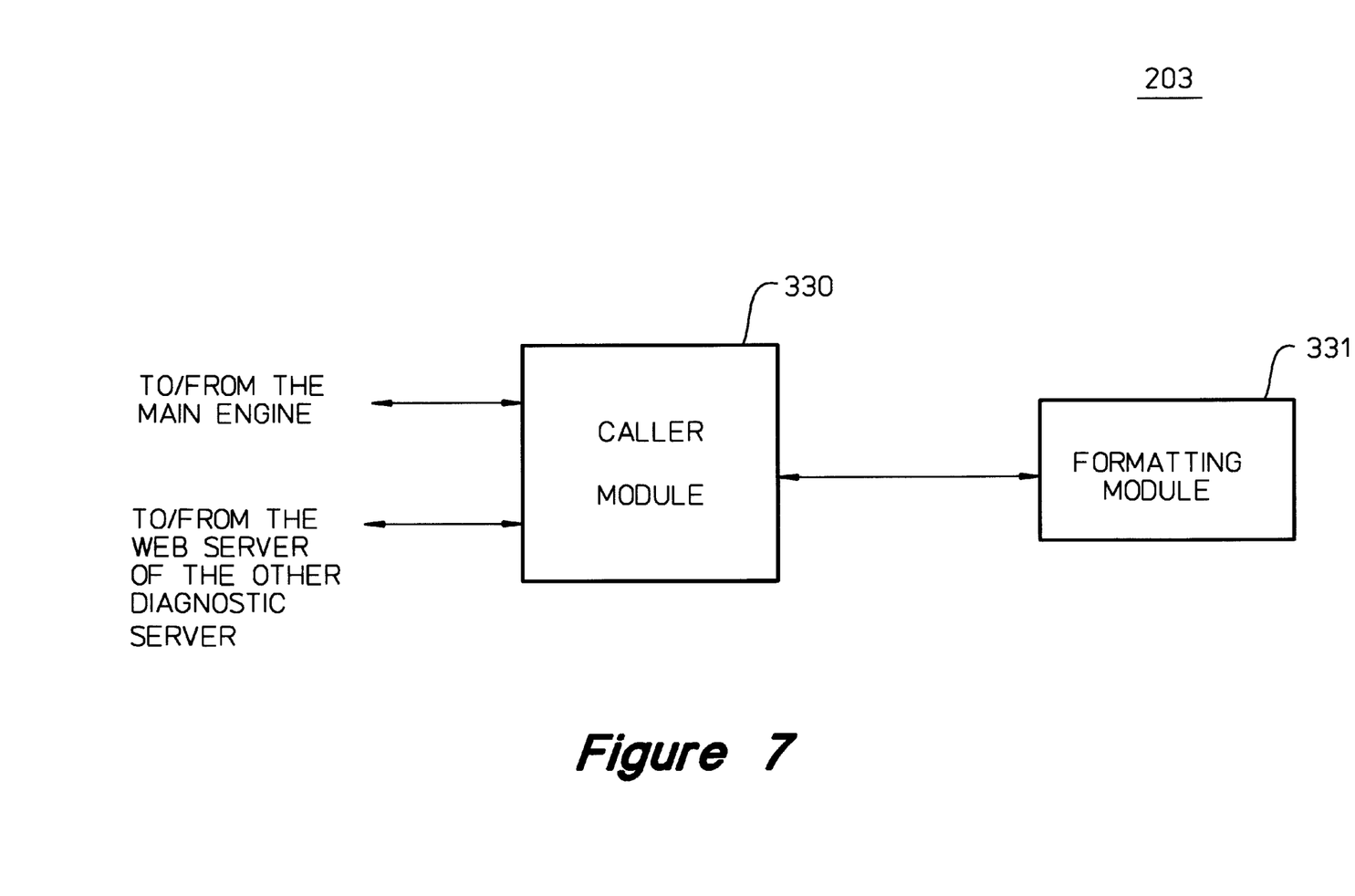
FIG. 7 shows the structure of each of the inter-domain test modules of FIG. 5 that includes a caller module and a formatting module.
Figure 8:
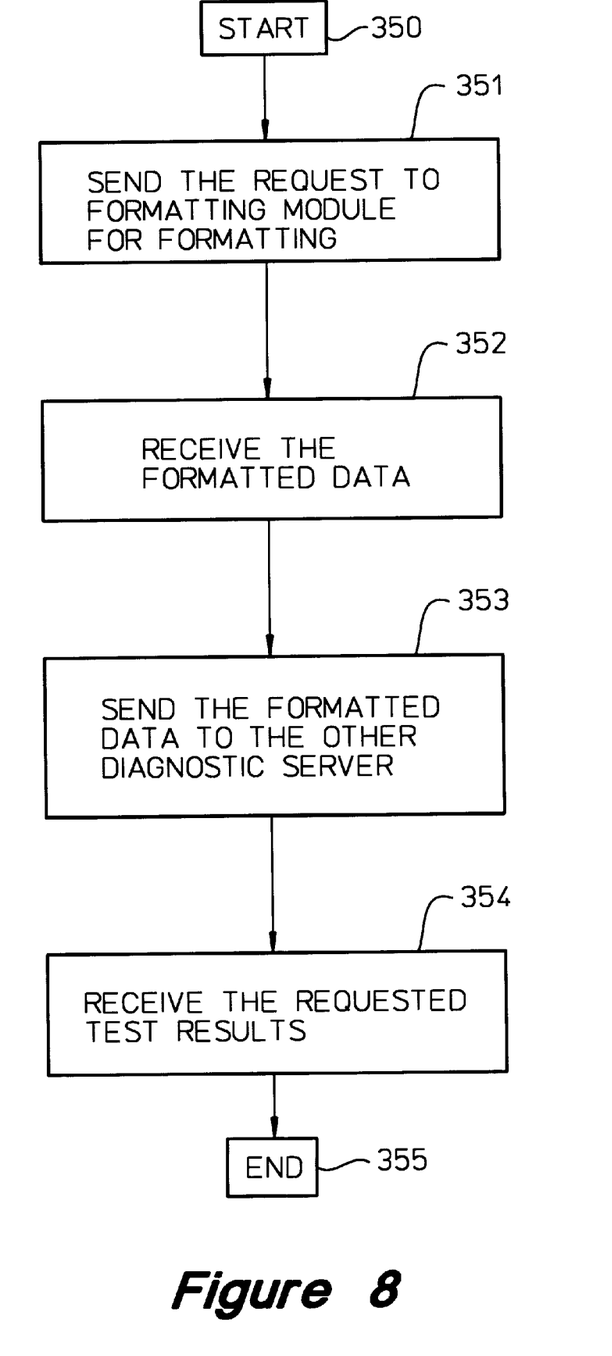
FIG. 8 shows in flow chart diagram form the process of the caller module of FIG. 7.

FIG. 7 shows the functional structure of the inter-domain test module 203. As can be seen from FIG. 7, the inter-domain test module 203 includes a caller module 330 and a formatting module 331. The caller module 330 communicates with the formatting module 331 via function calls. The caller module 330 includes the web browser function and is used to send diagnostic request to the formatting module 331 for formatting. The formatting module 331 is used to encode the diagnostic request received from the caller module 330 into the HTML-based form. The formatted diagnostic request is then sent by the caller module to another diagnostic server in another control domain using the open standard communication protocol. Both the caller module 330 and the formatting module 331 can be implemented using known web access technology. The process of the caller module 330 is shown in FIG. 8, which will be described in more detail below. The process of the formatting module 331 is shown in FIG. 9, which will also be described in more detail below.

As can be seen from FIG. 8, the process of the caller module 330 starts at the step 350. At the step 351, the caller module 330 sends the input data of the diagnostic request that are to be formatted to the formatting module 331. The caller module 330 then receives the formatted input data from the formatting module 330 at the step 352. The caller module 330 then sends the formatted input data to another diagnostic server in another control domain at the step 353. This is done using the open standard communication protocol. The caller module 330 then receives the test results from the other diagnostic server at the step 354.

Figure 9:
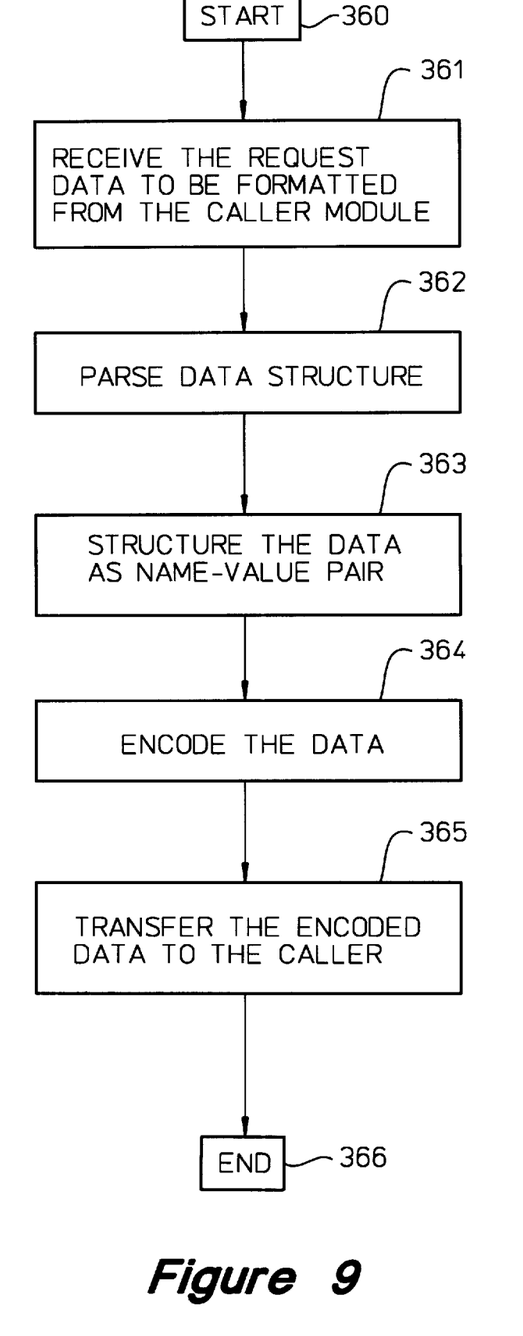
FIG. 9 shows in flow chart diagram form the process of the formatting module of FIG. 7.

As can be seen from FIG. 9, the process of the formatting module 331 of FIG. 7 starts at the step 360. At the step 361, the formatting module 331 receives the input data of the diagnostic request that are to be formatted from the caller module 330. The formatting module 331 then pares the input data into proper data structure at the step 362. The formatting module 331 then structures the input data as Name-Value pair at the step 363, and encodes the data at the step 364. The encoded data are then transferred to the caller module 330 at the step 365.

Figure 12:
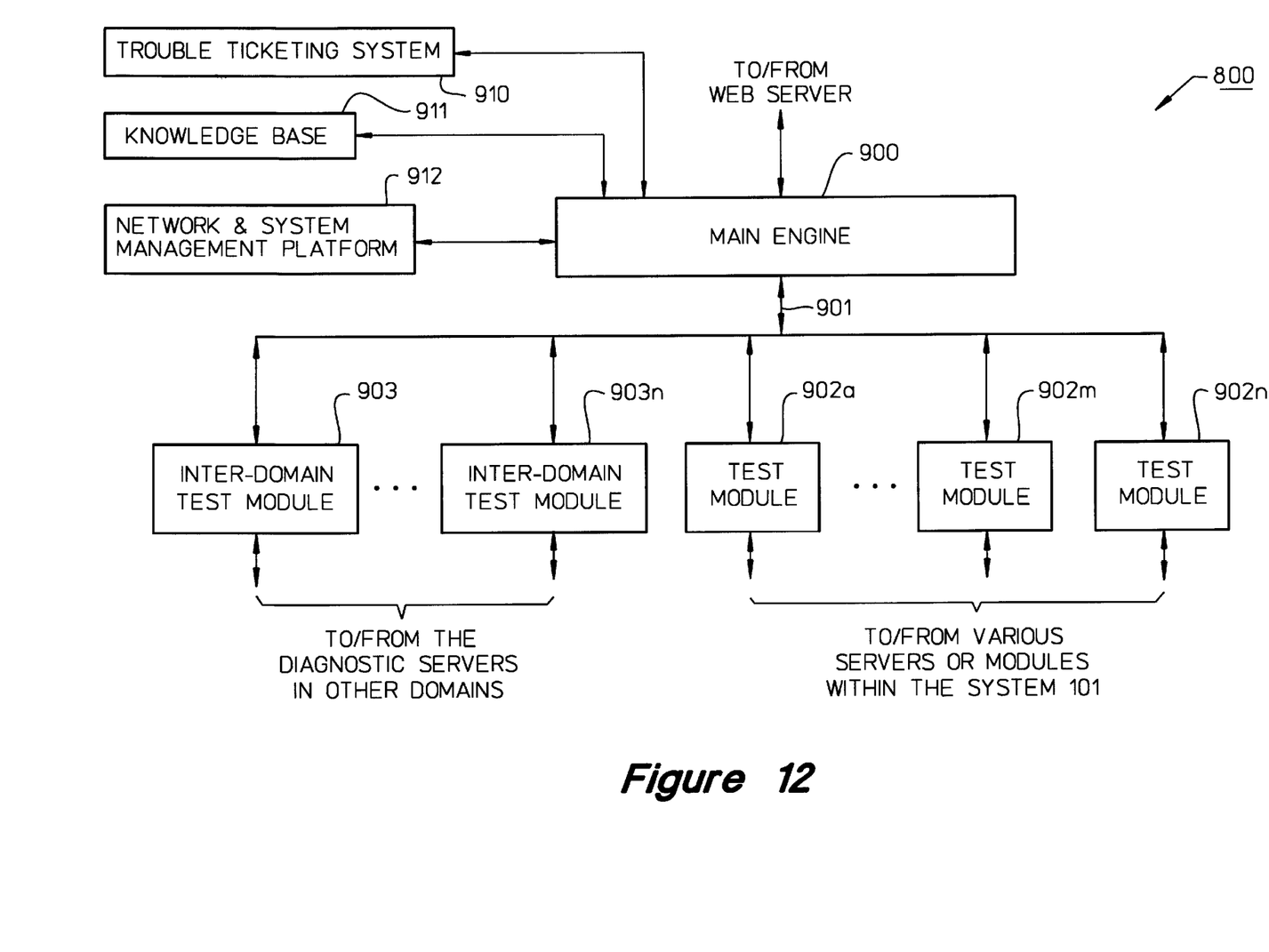
FIG. 12 shows the structure of the diagnostic engine of the diagnostic server of FIG. 3 in accordance with another embodiment of the present invention.

FIG. 12 shows a diagnostic engine 800 that implements another embodiment of the present invention. As can be seen from FIG. 12, in addition to the main engine 900, the test modules 902a–902n, and the interdomain test modules 903–903n, the diagnostic engine 800 also includes a trouble ticketing system 910, a knowledge base 911, and a network and system management platform 912. These three components provide the main engine 900 of the diagnostic engine 800 with history information of troubleshooting and the system configuration information. This allows the diagnostic engine 800 to be a more intelligent diagnostic system.

In the foregoing specification, the invention has been described with reference to specific embodiments thereof. It will, however, be evident to those skilled in the art that various modifications and changes may be made thereto without departing from the broader spirit and scope of the invention. The specification and drawings are, accordingly, to be regarded in an illustrative rather than a restrictive sense.

What is claimed is:

1. A diagnostic system for a data access networked system that includes a plurality of data service systems coupled together, comprising:
   (A) a plurality of diagnostic modules, each within one of the data service systems and running a number of diagnostic tests to check modules within that data service system upon receiving a diagnostic request, wherein each of the data service systems is independently administrated such that modules within each data service system cannot be directly accessed by external source and the diagnostic modules transmit diagnostic requests and diagnostic results to one another using an open standard communication protocol, wherein if a first diagnostic module in a first data service system wants to diagnose modules in a second data service system, the first diagnostic module is not allowed to directly access these modules in the second data service system and must transmit a diagnostic request, using the open standard communication protocol, to activate a second diagnostic module in the second data service system which then sends the diagnostic results of these modules back to the first diagnostic module;
   (B) a diagnostic terminal coupled only to the first diagnostic module of the diagnostic modules to generate the diagnostic request to the first diagnostic module and display the diagnostic results received from the first diagnostic module via the open standard communication protocol.

2. The diagnostic system of claim 1, wherein the open standard communication protocol is a Hyper Text Transport Protocol (HTTP) used for Internet/Intranet accesses.

3. The diagnostic system of claim 2, wherein the diagnostic terminal further comprises a web browser that generates and sends the diagnostic request to the first diagnostic module using the HTTP protocol.

4. The diagnostic system of claim 3, wherein the diagnostic terminal is coupled to one of the data service system that includes the first diagnostic module.

5. The diagnostic system of claim 2, wherein each of the diagnostic modules further comprises
   (a) a web server that decodes the diagnostic request received from the diagnostic terminal;
   (b) a diagnostic engine that runs the diagnostic tests based on the decoded diagnostic request.

6. The diagnostic system of claim 5, wherein the diagnostic engine further comprises a plurality of test modules that perform the diagnostic tests and a main engine that validates the decoded diagnostic request and correlates test results from the test modules.

7. The diagnostic system of claim 6, wherein each of the test modules further comprises a diagnostic tester that runs a predetermined test and a test wrapper that enables the diagnostic tester and passes the test result from the tester to the main engine.

8. The diagnostic system of claim 5, wherein the diagnostic engine further comprises at least one inter-domain test module that regenerates and sends the decoded diagnostic request to other diagnostic modules using the open standard communication protocol.

9. The diagnostic system of claim 8, wherein the inter-domain test module further comprises
   (I) a formatting module that formats the decoded diagnostic request in accordance with the open standard communication protocol;
   (II) a caller module that sends the decoded diagnostic request to the formatting module for formatting and then sends the formatted diagnostic request to other diagnostic modules.

10. A diagnostic system for a data service system of a data access networked system, comprising:
   (A) a diagnostic server within the data service system to initiate a plurality of diagnostic tests to detect faulty modules within the data service system upon receiving a diagnostic request, wherein the data service system is independently administrated such that modules of the data service system are not allowed to be directly accessed by external source and the diagnostic server is externally activated only by the diagnostic request sent to the data service system via an open standard communication protocol, wherein the diagnostic server then sends diagnostic results of the data service system back using the same open standard communication protocol;
   (B) a diagnostic terminal coupled to the data service system to transmit the diagnostic request to the diagnostic server and to receive the diagnostic results from the data service system via the open standard communication protocol.

11. The diagnostic system of claim 10, wherein the open standard communication protocol is a Hyper Text Transport Protocol (HTTP) used for Internet/Intranet accesses.

12. The diagnostic system of claim 11, wherein the diagnostic terminal further comprises a web browser that generates and sends the diagnostic request to the diagnostic sever using the HTTP protocol.

13. The diagnostic system of claim 11, wherein the diagnostic server further comprises
   (a) a web server that decodes the diagnostic request received from the diagnostic terminal;
   (b) a diagnostic engine that runs the diagnostic tests based on the decoded diagnostic request.

14. The diagnostic system of claim 13, wherein the diagnostic engine further comprises a plurality of test modules that perform the diagnostic tests and a main engine that validates the decoded diagnostic request and correlates test results from the test modules.

15. The diagnostic system of claim 14, wherein each of the test modules further comprises a diagnostic tester that runs a predetermined test and a test wrapper that enables the diagnostic tester and passes the test result from the tester to the main engine.

\* \* \* \* \*